US012280774B2

United States Patent
Brown et al.

(10) Patent No.: US 12,280,774 B2
(45) Date of Patent: Apr. 22, 2025

(54) METHODS AND SYSTEMS TO CONTROL DRIVER ASSIST SYSTEMS

(71) Applicant: Ford Global Technologies, LLC, Dearborn, MI (US)

(72) Inventors: Nicholas James Brown, Hornchurch (GB); Ryan Wells, Cold Norton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 17/512,269

(22) Filed: Oct. 27, 2021

(65) Prior Publication Data

US 2023/0127515 A1    Apr. 27, 2023

(51) Int. Cl.
  *B60W 30/12* (2020.01)
  *B60W 30/18* (2012.01)

(52) U.S. Cl.
  CPC ...... *B60W 30/12* (2013.01); *B60W 30/18109* (2013.01); *B60W 2420/403* (2013.01)

(58) Field of Classification Search
  CPC .......... B60W 30/12; B60W 30/18109; B60W 2420/42; B60W 2420/403
  See application file for complete search history.

(56) References Cited

U.S. PATENT DOCUMENTS

| | | | |
|---|---|---|---|
| 10,369,925 B2 | 8/2019 | Cannella et al. | |
| 10,501,075 B2 | 12/2019 | Harada et al. | |
| 11,022,978 B1 | 6/2021 | Konrardy et al. | |
| 11,242,051 B1* | 2/2022 | Konrardy | G08G 1/096791 |
| 2018/0297603 A1* | 10/2018 | Jun | G08G 1/167 |
| 2019/0241161 A1 | 8/2019 | Aitidis et al. | |
| 2020/0331500 A1* | 10/2020 | Shabtai | G05D 1/0055 |
| 2022/0266869 A1* | 8/2022 | Ito | B60W 60/0053 |

FOREIGN PATENT DOCUMENTS

CN            105774779         7/2016

* cited by examiner

*Primary Examiner* — Adam R Mott
*Assistant Examiner* — Sagar Kc
(74) *Attorney, Agent, or Firm* — Haley Guiliano LLP (57) ABSTRACT

Systems and methods are provided herein to improve control of automatic driver assist systems in a vehicle and a vehicle comprising said systems, for example, by enabling the automatic driver assist systems to be selectively deactivated or activated under certain conditions.

18 Claims, 5 Drawing Sheets

METHODS AND SYSTEMS TO CONTROL DRIVER ASSIST SYSTEMS

BACKGROUND

The present disclosure relates to methods and systems to control automatic driver assist systems in vehicles and vehicles comprising said systems. More particularly, but not exclusively, the present disclosure relates to deactivating an automatic driver assist system by preventing data from a device necessary for the function of the automatic driver assist system from inputting data into the automatic driver assist system.

SUMMARY

The provision of automatic driver assist (ADA) systems, which may also be referred to as automated driver assists, automated driver assist systems, automatic driver assists, automatic driver assistance systems, advanced driver-assistance systems or driver aids, are becoming standardized on vehicles. As such, ADA systems are now frequently provided as standard on road vehicles at the time of homologation and, thus, are not intended to be optional or disabled. Examples of ADA systems include, but are not limited to, lane-keeping assists and autonomous emergency braking systems.

While, ADA systems improve ease of operation of vehicles, there are a number of certain circumstances in which it may be beneficial for the ADA systems to be disabled or switched off. For example, emergency responders, such as the fire, police and ambulance services, may wish to disable ADA systems when responding to an emergency, as ADA systems may impede the emergency response vehicle due to their atypical movement and manoeuvres while responding to an emergency.

A number of the methods used by upfitters to disable ADA systems are permanent and irreversible. However, permanent or irreversible disabling of the ADA systems is undesirable as this reduces the operational capabilities of, for example, emergency response vehicles during regular use, routine patrols, or returning for attending an emergency incident. Furthermore, allowing the ADA systems to be disabled through navigation through a menu or complex process is undesirable as it may delay the emergency response time. Furthermore, it is desirable to be able to determine when an ADA system of a vehicle has been improperly deactivated and/or deactivated without proper reason.

Systems and methods are provided herein to improve control of ADA systems in vehicles by, for example, enabling the ADA systems to be selectively deactivated or activated under appropriate conditions. Vehicles comprising said systems are also provided.

According to some aspects of the present invention, the systems and methods are provided that identify a condition in (e.g., an operational condition of) a vehicle. In response to identifying the condition in the vehicle, at least one device, for example, a forward-facing radar and/or an image processing module, that is necessary, at least in part, for the function of at least a part of the ADA system, for example, autonomous emergency braking system or lane-keeping assist system, is prevented from inputting data into a controller, for example, a control system, of the ADA system. For example, an image processing module may be prevented from inputting data required for the function of a lane-keeping assist system, or a forward-facing radar may be prevented from inputting data required for the function of an autonomous emergency braking system. In this way, there is provided a method and/or a system that can controllably deactivate an ADA system, e.g., only under appropriate conditions. Such systems and methods are particularly advantageous when the ADA system is standard-fit on a vehicle or compulsory due to road regulations and is not an option, as it allows the vehicle's user to deactivate the ADA system selectively. It is envisaged that the present invention may be particularly beneficial for emergency response vehicles that have been upfitted from production models as it eliminates the need for upfitters to disable or tamper with the ADA system. Furthermore, by preventing the device from inputting data into the ADA system, e.g., in the controller of the ADA system, the device is not necessarily powered down or disabled entirely. For example, a data communication channel may be interrupted to prevent data flow between the device and system. In this way, the device may be available for use by other systems of the vehicle, which may be particularly advantageous as devices are used for multiple functions. For example, forward-facing radar devices may be used in both autonomous emergency braking systems and parking assist systems.

In the context of the present disclosure, further examples of ADA systems include, but not limited to, adaptive cruise control, collision avoidance systems, electronic stability control, forward collision warning, intersection assistants, intelligent speed adaption, lane centering system, lane departure warning systems, and/or wrong-way driving warning systems. In the context of the present disclosure, identifying the condition in a vehicle will be understood to mean detecting, sensing, detecting, analyzing and/or recognizing that at least one specific condition, state, status, value, or threshold has been achieved or reached in at least part of the vehicle. For example, the identified condition may be that the emergency sirens have been activated or that a switch has been actuated.

In the context of the present disclosure, the device will be understood to be a component of the automatic driving assist system, a separate apparatus, or any intermediatory between the two extremes. For example, the device may be a sensor that is communicatively connected to the automatic driving assist system or a processing module of the automatic driving assist system. Furthermore, it will be understood that the device is necessary for the function of the ADA system in that the device is essential for the correct and accurate triggering of driver assists or essential for the ADA to power on or produce any triggers or results. For example, the operational parameters of a sensor may be adjusted to reduce the sensitivity of the sensor and, therefore, produce inaccurate results, or the device may be powered down entirely.

In some examples, in response to identifying the condition in the vehicle, a second device necessary for the function of the ADA system may also be prevented from inputting data into the ADA system. Preventing a second device from inputting data may be particularly advantageous when the function of the ADA system requires multiple devices to save power or prevent false positive detection events.

In some examples, the device may be prevented from inputting data into the ADA system by powering down the device. In some examples, the device may be powered down by interrupting the power supply of the device. In some examples, the power supply of the device is interrupted by physically interrupting the power supply. In some examples, the device may be powered down by adjusting one or more operational parameters of a component of the device. Powering down the device, rather than the ADA system itself, can be particularly advantageous to increase the speed with which the ADA system is deactivated.

In some examples, the device may be prevented from inputting data into the ADA system by interrupting a data communication channel from the device. In some examples, it is advantageous to interrupt a data communication channel when the device is used for multiple functions.

In some examples, the ADA system may be an autonomous emergency braking system. In some examples, the device may be a forward-facing radar. In some examples, it is advantageous for the device to be a forward-facing radar when the ADA system is an autonomous emergency braking system. Deactivating the autonomous emergency braking system is particularly advantageous when the vehicle is an emergency response vehicle.

In some examples, the ADA system is a lane-keeping assist system. In some examples, the device is may be an image processing module. In some examples, it is advantageous for the device to be an image processing module when the ADA system is an lane-keeping assist system. Deactivating the lane-keeping assist system is particularly advantageous when the vehicle is an emergency response vehicle.

In some examples, the condition identified may be at least one selected from a group comprising a range of GPS coordinates, a driving style, the on-off state of emergency response sirens, the on-off state lights and/or lamps, the acceleration of the vehicle, the movement of the vehicle, and/or an output of a sensor.

In some examples, the condition identified is the state of an activation-deactivation switch. In the context of the present disclosure, an activation-deactivation switch will be understood to be an on-off switch, lever, button or similar user-actuated mechanism.

In some examples, the activation or deactivation status of the ADA system may be displayed. The activation or deactivation status may be displayed, for example, to the driver or passenger within the vehicle by a head-up display or on the dashboard of the vehicle.

In some examples, the activation or deactivation status of the ADA system may be communicated to a vehicle control server. Communication between the vehicle and vehicle control server may occur by any wireless or over-the-air form of communication, for example, radio transmissions or cellular networks.

In some examples, one or more instructions from the vehicle control server to reactivate or deactivate the ADA system may be received. These over-the-air instructions are beneficial in preventing some users from deactivating the ADA systems as they may be required by regulations or for the vehicle's warranty to be valid. Additionally, for emergency response vehicles, instructions to deactivate the ADA system may be received to ensure that such systems are only disabled during approved times.

In some examples, a second condition in the vehicle may be identified, and in response to the second condition being identified in the vehicle, the ADA system may be reactivated by allowing data from the device to be input into the ADA system. In the context of the present disclosure, allowing data to be input into the ADA system may include powering on a device or ceasing to interrupt a data communication channel, thereby enabling the device to communicate with the ADA system.

According to one aspect of the present invention, an ADA control system is provided. The ADA control system comprises a device necessary for the function of an ADA system; a means for identifying a condition in the vehicle; and a means for preventing the device from inputting data into the ADA system in response to identifying the condition in the vehicle. According to one aspect of the present invention, an ADA controller is provided. The ADA controller is configured to be operationally coupled to a device necessary for the function of an ADA system. The ADA controller is configured to identify a condition in the vehicle; and prevent the device from inputting data into the ADA system in response to identifying the condition in the vehicle.

According to one aspect of the present invention, a vehicle comprising the ADA control system and/or ADA controller is provided.

According to one aspect of the present invention, a non-transitory computer-readable medium is provided. The non-transitory computer-readable may have non-transitory computer-readable instructions encoded thereon for controlling an ADA system for execution by control circuitry to cause the control circuitry to perform the steps of: identifying a condition in the vehicle; and in response to identifying the condition in the vehicle, preventing a device necessary for the function of the ADA system from inputting data into the ADA system.

According to one aspect of the present invention, there is provided a diagnostic method for determining an operational state of an ADA system of a vehicle. The diagnostic method comprises determining whether data is prevented from being input into an ADA controller from a device necessary for the function of the ADA system. The method may comprise, in response to determining that data is prevented from being input into the ADA controller from the device necessary for the function of the ADA system, indicating a fault with the ADA system, e.g., based on a condition of the vehicle. In some examples, one or more systems and/or components of the vehicle may be controlled, e.g., at least partially deactivated, in response to determining that data is prevented from being input into the ADA controller from the device necessary for the function of the ADA system and one or more conditions of the vehicle are not satisfied. For example, the method may comprise limiting operation of the vehicle, in response to determining that data is being prevented from being input into an ADA controller in an improper manner, e.g., by virtue of one or more conditions of the vehicle not being satisfied.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
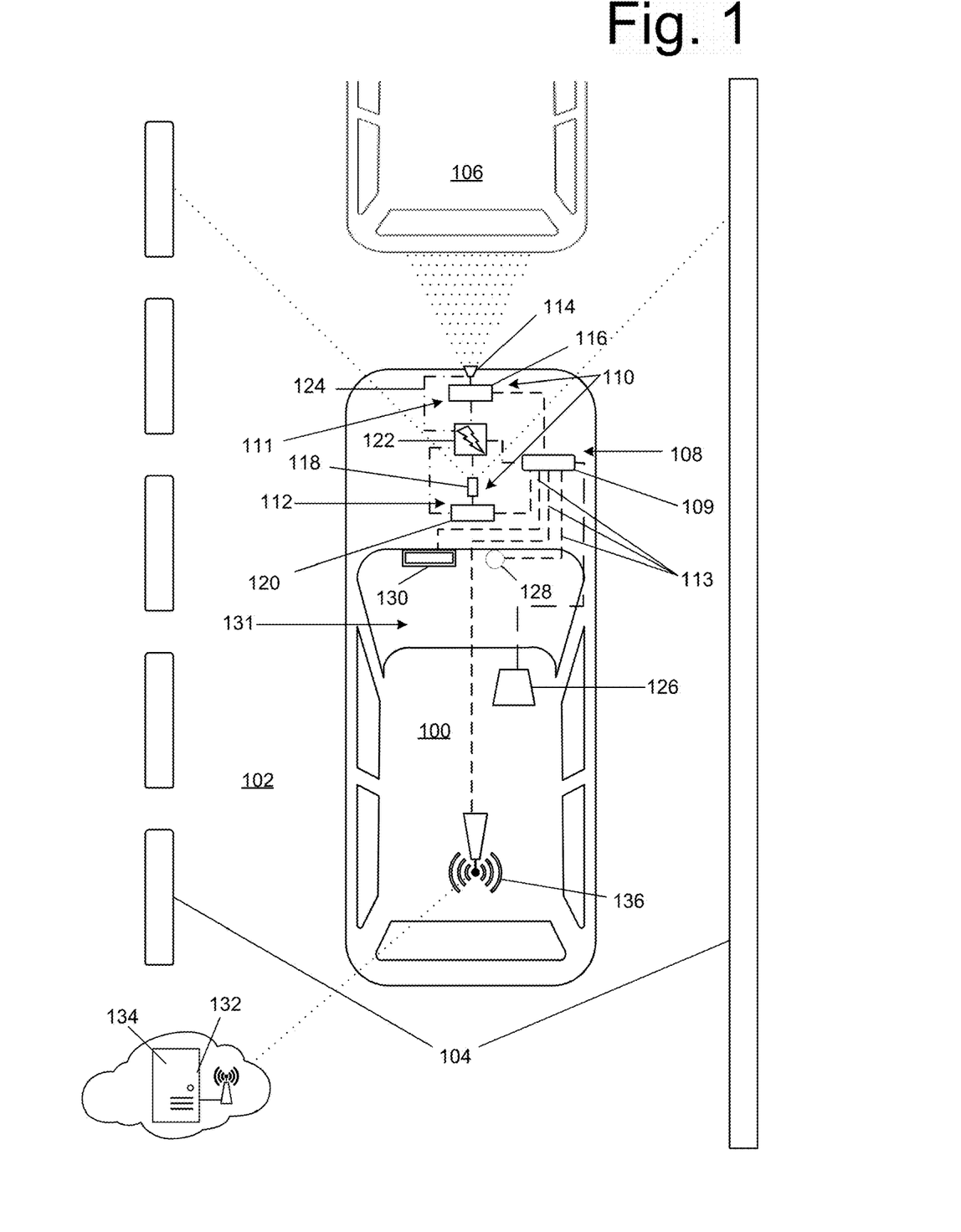
FIG. 1 illustrates a schematic of an exemplary vehicle having an ADA control system for the control of an autonomous emergency braking (AEB) system and a lane-keeping assist (LKA) system, in accordance with some examples of the disclosure.

FIG. 1 depicts a schematic of an exemplary vehicle 100, in use upon a road 102 with lane markings 104, behind a second vehicle 106, where the vehicle 100 comprises an ADA control system 108. In the example shown in FIG. 1, the ADA control system 108 comprises a controller 109 which is configured to control the two ADA systems 110 present in this example: an autonomous emergency braking (AEB) system 111 and a lane-keeping assist (LKA) system 112. The controller 109 is communicatively coupled to the AEB system 111 and the LKA system 112 by data communication channels 113.

While the example shown in FIG. 1 exemplifies the use of an AEB system 111 and an LKA system 112 as ADA systems 110 within (or of) a vehicle 100, it is understood that the ADA system 110 may be another appropriate ADA system, for example, an adaptive cruise control system, a collision avoidance system, an electronic stability control, a forward collision warning system, an intersection assistant system, an intelligent speed adaption system, a lane centering system, a lane departure warning system, or a wrong-way driving warning system.

In the example shown in FIG. 1, the vehicle 100 is, for example, a car and may be another vehicle that comprises a suitable ADA system 110 and ADA control system 108. For example, the vehicle may be a truck, van, pickup truck, lorry, HGV, minivan, bus, ambulance, fire truck, or police car.

In the example shown in FIG. 1, the AEB system 111 comprises a forward-facing radar 114, also known as front-facing radar, that is arranged to detect the speed and distance of the second vehicle 106 from the first vehicle 100. In the example shown in FIG. 1, the AEB system 111 further comprises a detection processing module 116, which is communicatively coupled to the forward-facing radar 114 and controller 109. The detection processing module 116 is configured to process the data from the forward-facing radar 114 and communicate with the controller 109 to trigger the brakes of the vehicle 100 in response to detection events.

In the example shown in FIG. 1, the LKA system 112 comprises a forward-facing camera 118 that is arranged to detect the lane markings 104. The LKA system 112 further comprises an image processing module 120 that is communicatively coupled to the forward-facing camera 118 and the controller 109. The image processing module 120 is configured to detect the distance of the vehicle 100 from the lane markings 104 on either side of the road 102 and communicate with the controller 109 to trigger a warning signal in response to detection events.

In the example shown in FIG. 1, the AEB system 111 and the LKA 112, and their components, are electrically coupled with and powered by a power supply 122 via electricity cables 124. The power supply 122 may be, for example, a battery, capacitor or generator. The power supply 122 is also communicatively coupled with the controller 109 by data communication cables 113. The controller 109 is configured to control the power supplied by the power supply 122 to various components of the ADA system 110. For example, in the example shown in FIG. 1, the controller 109 is configured to stop the power supply 122 from supplying power to the image processing module 120 of the LKA system 112 or the forward-facing radar 114 of the AEB system 111.

In the example shown in FIG. 1, the controller 109 is additionally communicatively coupled with an emergency response siren 126 and an activation-deactivation, or on-off, switch 128. In the example shown in FIG. 1, the controller 109, and therefore, the ADA control system 108, is configured to monitor the state of the emergency response siren 126 and the activation-deactivation switch 128. However, the controller 109 is not limited to only monitoring the condition of the siren 126 and the switch 128 and can monitor the condition of a number of inputs, for example, but not limited to, a range of GPS coordinates, a driving style, the on-off state of emergency response sirens, the on-off state lights and/or lamps, the acceleration of the vehicle, the movement of the vehicle, an output of a sensor, and/or a signal from a vehicle control server, such as a server of an emergency vehicle HQ.

In the example shown in FIG. 1, the controller 109 is additionally configured to communicate the activation or deactivation status of the ADA systems 110 to a display 130 that is located within a passenger cab 131 of the vehicle 130. The activation or deactivation status of the ADA systems 110 may be alert communicated to a driver of the vehicle by any audiovisual means such as a sound, chime, alarm, warning light, icon display.

In the example shown in FIG. 1, the controller 109 is configured to send and receive wireless communications over-the-air via an antenna 136 to and from a vehicle control server 132 that may be located within the cloud 134.

Figure 2:
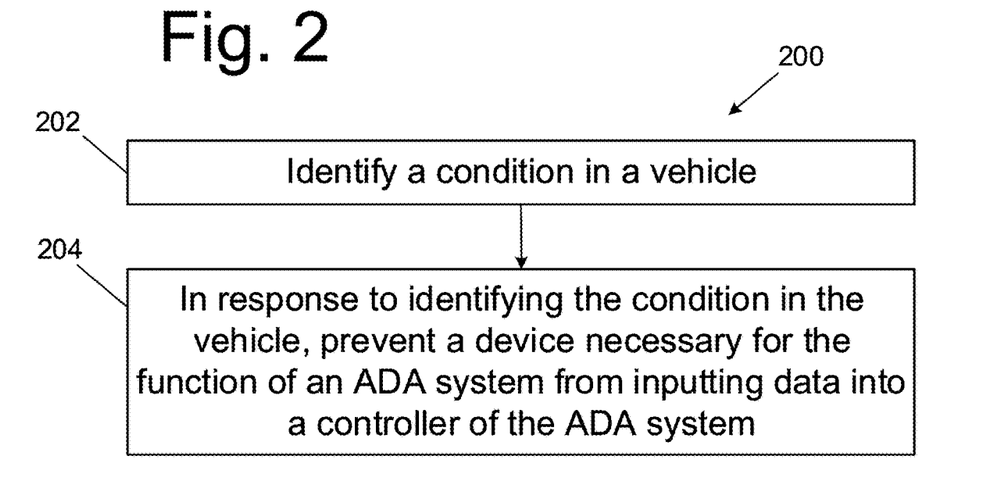
FIG. 2 illustrates an example flowchart of a method to control an ADA system of a vehicle, in accordance with some examples of the disclosure.

FIG. 2 is a flowchart representing an illustrative process 200 for controlling an ADA system of a vehicle, in accordance with some examples of the disclosure. Whilst the example process shown in FIG. 2 refers to the use and control of ADA systems 110 of the example shown in FIG. 1, it will be appreciated that the illustrative process shown in FIG. 2, and any of the other following illustrative processes, may be implemented on the ADA systems 110 of FIG. 1 or on any other appropriately configured ADA systems.

At step 202, a condition in vehicle 100 is identified. For example, the controller 109 of the ADA control system 108 may be configured to identify that switch 128 has been actuated into its deactivated position or that the emergency sirens 126 have been switched on. In some examples, the condition that is identified will be caused by the user, for example, actuating the switch 128 within the passenger cab 131 or activating the emergency sirens 126. In other examples, the condition that is identified will be automatically detected by sensors or components of the vehicle 100 as it may have exceeded a certain threshold or fall within a range of values. For example, the condition identified may be the GPS coordinates, the speed, the driving style, the acceleration, and/or the movement of the vehicle 100.

At step 204, in response to identifying the condition in the vehicle in step 202, a device that is necessary for the function of the ADA system 110, for example, the forward-facing radar 114 of the AEB system 111 or the image processing module 120 of the LKA system 112, is prevented from inputting data into the ADA system 100. For example, the forward-facing radar 114 may be prevented from inputting data into the AEB system 111 and the detection processing module 116 by powering down the forward-facing radar 114, or by interrupting data communications between the forward-facing radar 114 and the detection processing module 116. The forward-facing radar 114 may be powered down, for example, by the controller 109 instructing the power supply 122 to stop or limit the power supplied to the forward-facing radar 114 in response to a condition being identified in the vehicle. In this example, the forward-facing radar 114, once powered down, will be prevented or inhibited from providing data to the detection processing module 116 such that the AEB system 111 will not function as it lacks the necessary inputs to generate detection events and trigger the AEB system 111. In effect, the example of FIG. 2 provides a method of controllably and selectively deactivating the AEB system 111.

The actions or descriptions of FIG. 2 may be used with any other example of this disclosure, for example, the examples described below in relation to FIGS. 3A to 5. In addition, the actions and descriptions described in relation to FIG. 2 may be done in any suitable alternative orders or in parallel to further the purposes of this disclosure.

Figure 3A:
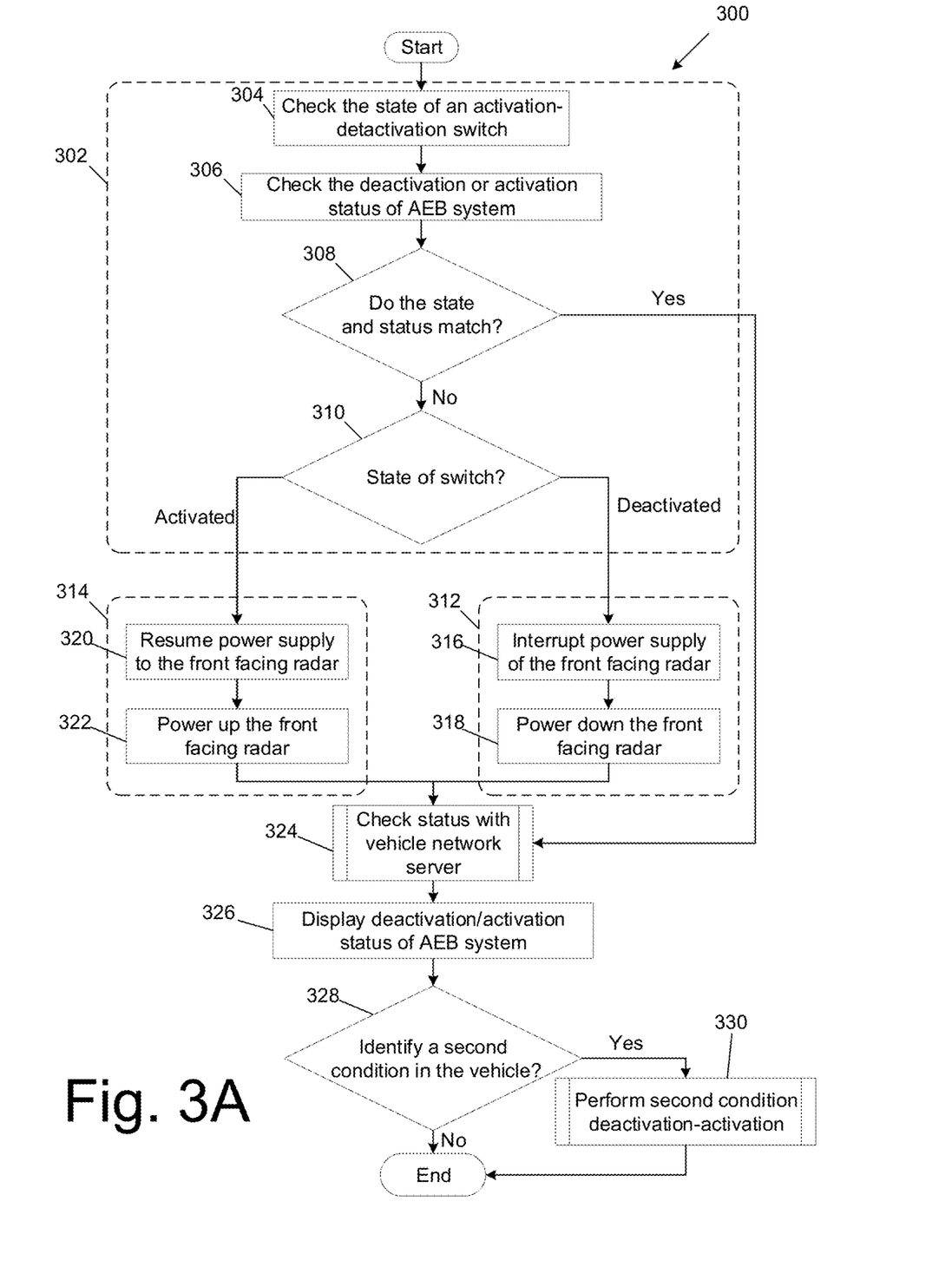
FIG. 3A illustrates an example flowchart of a method to control an ADA system of a vehicle, in accordance with some examples of the disclosure.
Figure 3B:
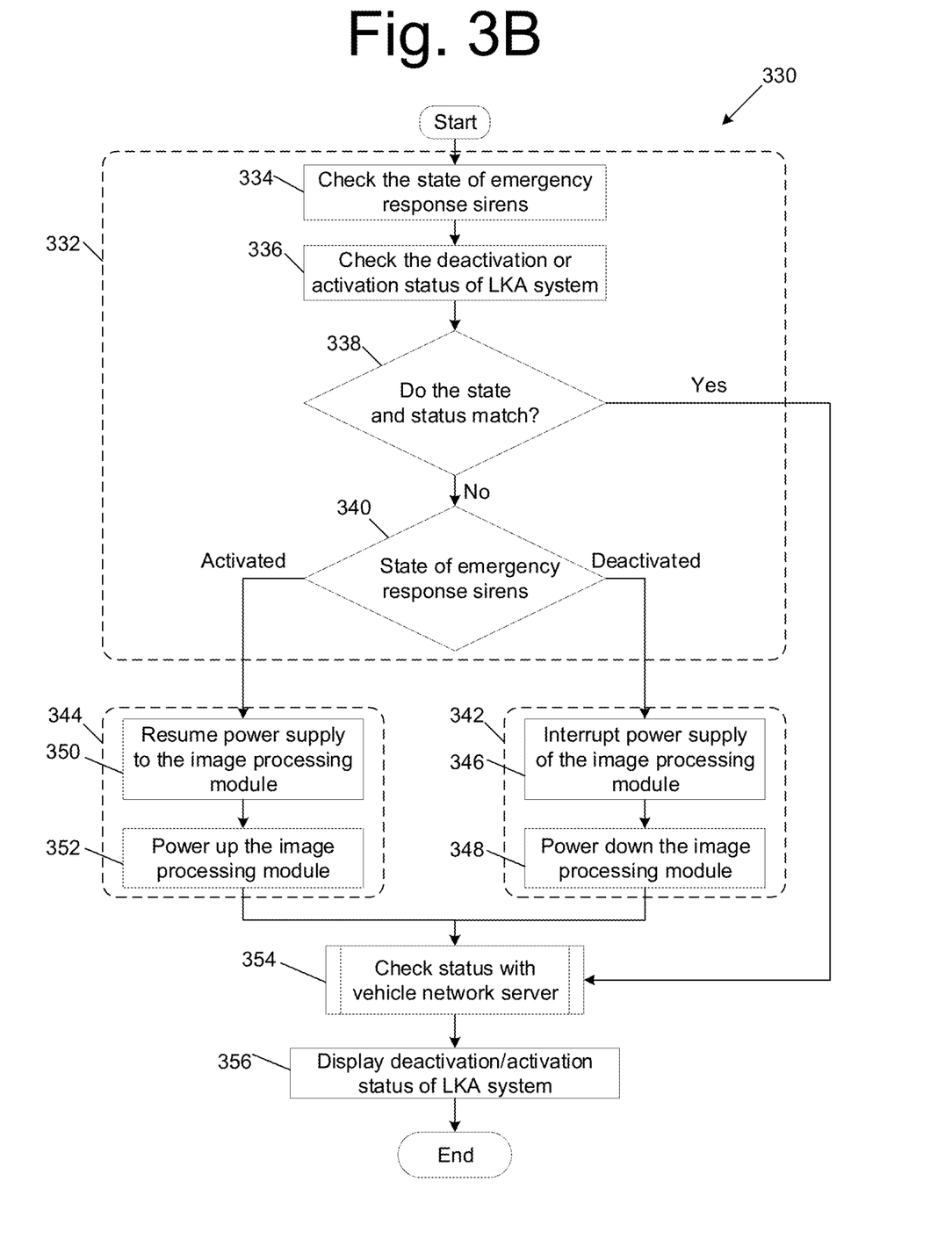
FIG. 3B illustrates an example flowchart of a sub-process of the method of FIG. 3A, in accordance with some examples of the disclosure.
Figure 3C:
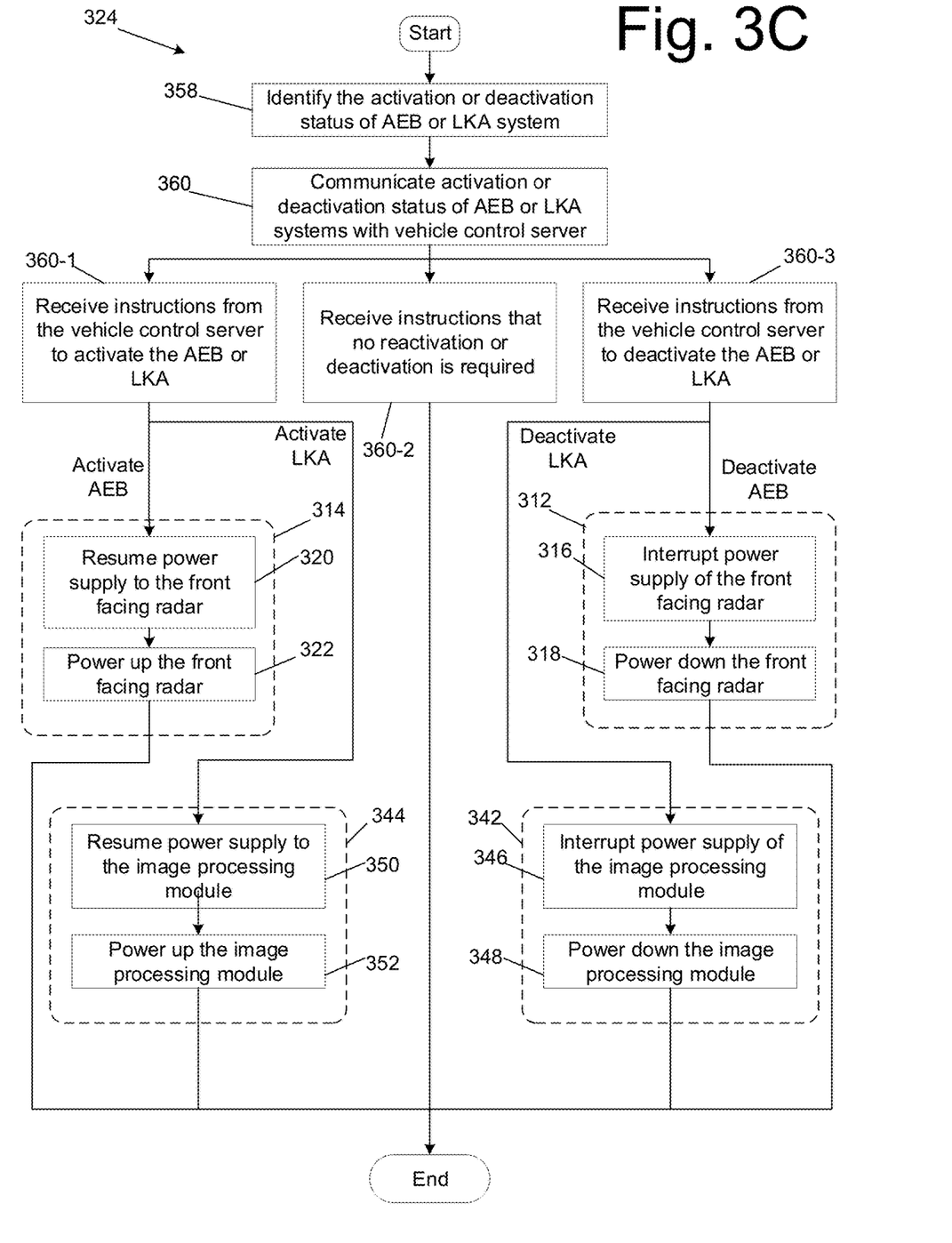
FIG. 3C illustrates an example flowchart of a sub-process of the method of FIG. 3A, in accordance with some examples of the disclosure.

FIG. 3A, FIG. 3B and FIG. 3C (hereinafter referred to as FIGS. 3A-C) depict a flow chart representing an illustrative process 300 for the control of two ADA systems 110, in accordance with some examples of the disclosure. While FIGS. 3A-C refer to the use and control of ADA systems 110, as shown in FIG. 1, it will be appreciated that the illustrative process shown in FIGS. 3A-C, and any of the other following illustrative processes, may be implemented on the ADA systems 110 of FIG. 1 or on any other appropriately configured ADA systems.

At step 304, the state of the activation-deactivation switch 128 is checked by the controller 109. The state of the switch 128 represents a condition in the vehicle 100 and, in this example, the switch 128 may be positioned and actuated between an activated position or a deactivated position, where the activated position indicates that the user wants the ADA system 110 to be activated and the deactivated position indicates that the user wants the ADA system 110 to be deactivated. In this example, the state of switch 128 is checked; however, any condition of the vehicle 100, as discussed previously, may be used during this step and subsequent steps.

At step 306, the status of the AEB system 111 is checked by the controller 109. In the example shown in FIGS. 3A-C, the AEB system 111 can be in an activated state, where the AEB system 111 is functional and available to generate detection events to trigger responses, or a deactivated state, where the AEB system 111 is not functional and cannot generate detection events. In this example, the status of AEB system 111 is checked; however, the status of any appropriate ADA system 110, as mentioned previously, could be used during this step and subsequent steps.

At step 308, the state of the switch 128 and the status of the AEB system 111 are compared to test whether or not the state and status match. If the state and status match, the process proceeds to step 324 as no action is required to change the status of the AEB system 111. For example, the state of switch 128 may be deactivated, and the status of AEB system 111 may be deactivated. If the state and status do not match, the process 300 proceeds to step 310 as the process 300 has determined that the status of the AEB system 111 should be altered. For example, the state of the switch 128 may be deactivated, but the status of the AEB system 111 may be activated, such that, in this scenario, the AEB system 110 should be deactivated.

At step 310, the state of switch 128 determines the path forward. If the state of the switch 128 is activated, the process proceeds to step 320 in order to activate the AEB system 111. If the state of the switch 128 is deactivated, the process proceeds to step 316 in order to deactivate the AEB system 111.

In the example shown in FIGS. 3A-C, steps 304, 306, 308 and 310 together can be considered as step 302 for identifying a condition in a vehicle, which is equivalent to step 202 from FIG. 2.

At step 316, in response to identifying that state of the switch 128 and the status of the AEB system 111 do not match and that the state of the switch 128 is deactivated, the controller 109 instructs the power supply 122 to interrupt the power supplied to the forward-facing radar 114.

At step 318, as the power supplied to the forward-facing radar 114 is interrupted, the forward-facing radar 114 is powered down such it does not function or provide data to the remainder of the AEB system 111, for example, the detection processing module 116.

In the example shown in FIGS. 3A-C, steps 316 and 318 can be considered as step 312. In this example, step 312 comprises preventing a device, e.g., the forward-facing radar 114, that is necessary for the function of the AEB system 111 from inputting data into the AEB system 111, thereby deactivating the ADA system 110. That is, powering down the device prevents data being input into the ADA control system 108.

At step 320, in response to identifying that the state of the switch 128 and the status of the AEB system 111 do not match and that the state of the switch is activated, the controller 109 instructs the power supply 122 to supply power to the forward-facing radar 114.

At step 322, as the power supplied to the forward-facing radar 114 is resumed, the forward-facing radar 114 is powered on and begins to function and provide data to the remainder of the AEB system 111, for example, the detection processing module 116.

In the example shown in FIGS. 3A-C, steps 320 and 322 can be considered as step 314. In this example, step 314 comprises allowing a device, the forward-facing radar 114, necessary for the function of the AEB system 111 to input data into the AEB system 111, thereby reactivating the AEB system 111. That is, powering up the device allows data to be input into the ADA control system 108.

At step 324, the status of the AEB system 111 is checked with the vehicle network server 132 using the sub-process of step 324 (see FIG. 3C). The sub-process of step 324 is discussed in more detail below.

At step 326, the deactivation/activation status of the AEB system 111 is communicated from the controller 109 to the display 130 within the passenger cab 131.

At step 328, the decision of whether a second condition in the vehicle is identified is performed. The decision of step 328 may be, for example, preprogrammed in the controller 109, may be initiated by another condition of the vehicle 100, for example, the state of the emergency sirens 126, or may be the presence of a second ADA system 110, for example, the LKA system 112 in the vehicle 100. If a second condition in the vehicle 100 is checked, then the process progress to step 328, and if a second condition is not checked, the process 300 completes.

A plurality of conditions, for example, a third, fourth or fifth condition, may also be identified subsequently to step 328 prior to the completion of the process 300. The subsequent identification can be used to control other ADA systems 100 present in the vehicle 100 in a manner equivalent, mutatis mutandis, to that described within the disclosure in relation to the AEB system 111 above and the LKA system 112 below.

At step 330, the sub-process for checking the second condition of the vehicle 100 is performed. In the example shown in FIGS. 3A-C, the sub-process of step 330 is similar in structure and function to step 304 through step 326 except that the state of the emergency sirens 126 is identified rather than the switch 128 and the LKA system 112 is controlled rather than the AEB system 111. Accordingly, the disclosures made in relation to steps 304 through 326 above also applies, mutatis mutandis, to steps 334 through 356.

At step 334, the state of the emergency sirens 126 is checked by the controller 109 to identify whether the sirens 126 are or have been activated or deactivated. The state of the emergency sirens 126 represents a condition in the vehicle 100 and, in this example, the state of the sirens 126 may be controlled in a manner typical for an emergency response vehicle; for example, the sirens 126 may be activated during a response to an emergency and remain deactivated the remainder of the time. In this example, the state of the sirens 126 is checked; however, any condition of the vehicle 100, as discussed previously, may be used during this step and subsequent steps.

At step 336, the status of the LKA system 112 is checked by the controller 109. In the example shown in FIGS. 3A-C, the LKA system 112 can be in an activated state, where the LKA system 112 is functioning and generating detection events to trigger responses, or a deactivated state, where the LKA system 112 is not functioning and generating detection events. In this example, the status of LKA system 112 is checked; however, the status of any appropriate ADA system 110, as mentioned previously, could be used during this step and subsequent steps.

At step 338, the state of the siren 126 and the status of the LKA system 112 are compared to test whether the state and status match, the same or align. If the state and status match, the process proceeds to step 354 as no action is required to change the status of the LKA system 112. For example, the state of the siren 126 may be deactivated, and the status of the LKA system 112 may be deactivated. If the state and status do not match, the process proceeds to step 340 as the sub-process 330 has determined that the status of the LKA system 112 should be altered. For example, the state of the siren 126 may be deactivated, but the status of the LKA system 112 may be activated, such that, in this scenario, the LKA system 112 should be deactivated.

At step 340, the state of the siren 126 determines the path forward. If the state of the siren 126 is activated, the process 330 proceeds to step 350 in order to activate the LKA system 112. If the state of the siren 126 is deactivated, the process proceeds to step 346 in order to deactivate the LKA system 112.

In the example shown in FIGS. 3A-C, steps 334, 336, 338 and 340 can be considered step 322 as it identifies a condition in a vehicle, which is equivalent to the step 202 from FIG. 2.

At step 346, in response to identifying that the state of the siren 126 and the status of the LKA system 112 do not match and that the state of the siren 126 is deactivated, the controller 109 instructs the power supply 122 to interrupt the power supplied to the image processing module 120.

At step 348, as the power supplied to the image processing module 120 is interrupted, the image processing module 120 is powered down and no longer functional and cannot receive data from the remainder of the LKA system 112, for example, from the forward-facing camera 118.

In the example shown in FIGS. 3A-C, steps 346 and 348 can be considered as step 342, step 342 prevents a device, for example, the image processing module 120, that is necessary for the function of the LKA system 112, from inputting data into the LKA system 112, thereby deactivating the LKA system 112.

At step 350, in response to identifying that the state of the siren 126 and the status of the LKA system 112 do not match and that the state of the switch is activated, the controller 109 instructs the power supply 122 to resume supplying power to the image processing module 120.

At step 352, as the power supplied to the image processing module 120 is resumed, the image processing module 120 is powered on and begins to function correctly and receive data from the remainder of the LKA system 112, for example, the image processing module 120.

In the example shown in FIGS. 3A-C, steps 350 and 352 can be considered, as step 344, and together steps 350 and 352 allow a device, for example, the image processing module 120, necessary for the function of the LKA system 112 to receive data from the forward-facing camera 118, thereby reactivating the LKA system 112.

At step 354, the status of the LKA system 112 is checked with the vehicle network server using the sub-process of step 324 (see FIG. 3C). The sub-process of step 324 is discussed in more detail below.

At step 356, the deactivation/activation status of the LKA system 112 is communicated from the controller 109 to the display 130 within the passenger cab 131 before the completion of sub-process 330.

FIG. 3C depicts an example flowchart of the sub-process 324 for checking the status of the ADA system 110, for example, the AEB system 111 or the LKA system 112, with the vehicle control server 132.

At step 358 of the sub-process 324, the activation status of the ADA system 110, for example, the AEB system 111 or the LKA system 112, is identified by the controller 109.

At step 360, the status of the ADA system, for example, the AEB system 111 or the LKA system 112, is communicated wirelessly over-the-air from the vehicle 100 to a vehicle control server 132 in the cloud 134. In this example, the vehicle control server 132 checks the status of the ADA system 110, for example, the AEB system 111 or the LKA system 112.

At steps 360-1, 360-2, or 360-3, the vehicle 100 receives instructions from the vehicle control server 132. At step 360-2, the controller 109 receives instructions to take no action such that sub-process 324 completes. At step 360-1, the controller 109 receives instructions to activate the AEB system 111 or the LKA system 112. At step 360-3, the controller 109 receives instructions to deactivate the AEB system 111 or the LKA system 112. The AEB system 111 or the LKA system 112 are then activated or deactivated, as per the instructions received, using the method steps previously disclosed.

Figure 4:
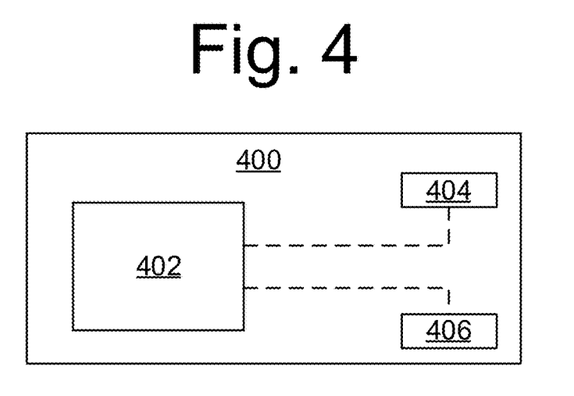
FIG. 4 illustrates an exemplary block diagram of an ADA control system, in accordance with some examples of the disclosure.

FIG. 4 shows an ADA control system 400, in accordance with some examples of the disclosure. Whilst the example system 400 shown in FIG. 4 refers to the use and control of ADA systems 110, as shown in FIG. 1, it will be appreciated that the illustrative process shown in FIG. 4, and any of the other following illustrative processes, may be implemented on the ADA systems 110 of FIG. 1 or on any other appropriately configured ADA systems.

In the example shown in FIG. 4, the ADA control system 400 comprises a device 402, for example, a forward-facing radar 114 or a forward-facing camera 118, a means 404 for identifying a condition in the vehicle 100, for example, the siren 126, the switch 128 or sensor, a means 406 for preventing a device from inputting data into a controller, for example, the controller 109. The ADA control system 400 is configured to identify a condition in the vehicle 100 from the means 404 and, in response to the condition being identified, prevent a device 402 from inputting data into the controller 109. In this way, the ADA control system 400 can deactivate and, therefore, control the ADA system 110. In some examples, the ADA control system 400 may comprise a controller to implement a diagnostic method for determining an operational state of at least part of an ADA system of a vehicle, as described above.

Figure 5:
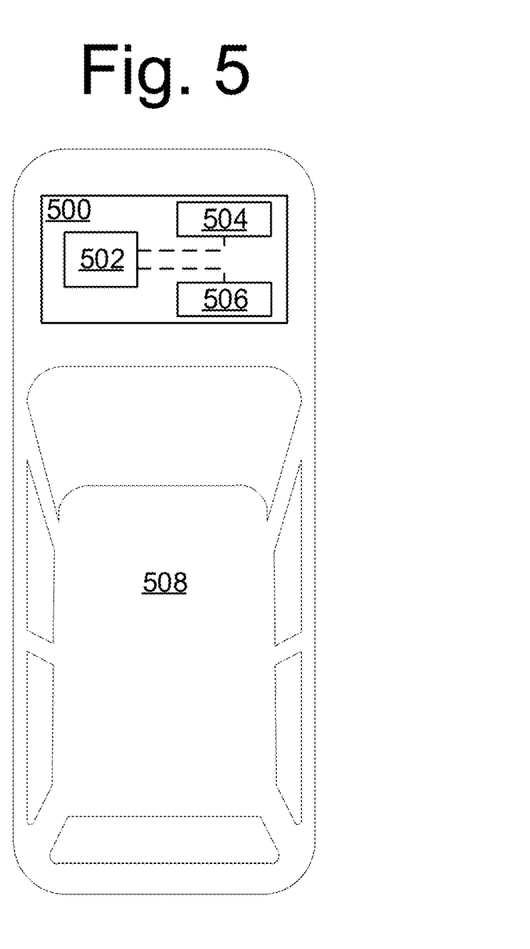
FIG. 5 illustrates an exemplary diagram of a vehicle comprising an ADA control system, in accordance with some examples of the disclosure.

FIG. 5 shows a vehicle 508 comprising an ADA control system 500, in accordance with some examples of the disclosure. In the example shown in FIG. 5, the ADA control system 500, the device 502, the means 504 for identifying a condition in the vehicle 508, are substantially identical to the ADA control system 400 of FIG. 4 and the discussion above regarding its function and features applies equally to the ADA control system 500 of FIG. 5.

Figure 6:
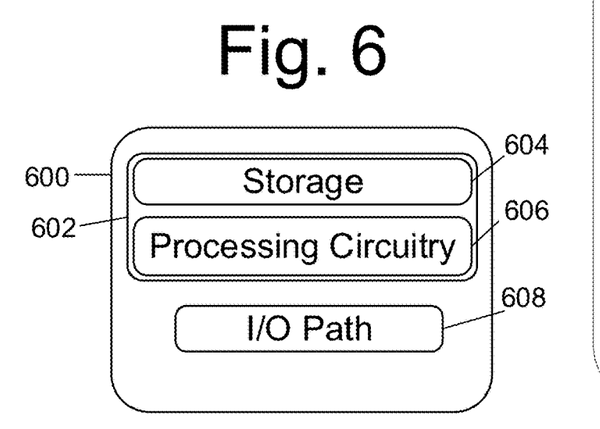
FIG. 6 illustrates an exemplary block diagram of a control system, in accordance with some examples of the disclosure.

FIG. 6 shows an exemplary block diagram of a controller 600. For example, controller 600 may be used to implement a diagnostic method for determining an operational state of an ADA system of a vehicle, as described above. The controller 109 shown in the example of FIG. 1 may be configured in the same manner as that disclosed the controller 600 shown in FIG. 6. Controller 600 includes control circuitry 602, which comprises storage 604 and processing circuitry 606, and I/O path 608. Controller 600 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors), or multiple different processors (e.g., an Intel Core i7 processor and an Intel Core i9 processor).

Storage 604, and/or storages of other components of other vehicle controllers, may be electronic storage devices. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, controller 600 executes instructions for an application stored in memory (e.g., storage 604). Specifically, controller 600 may be instructed by an application to perform the methods/functions discussed herein.

Additionally or alternatively, controller 600 may be configured to transmit and/or receive data via I/O path 608. For instance, I/O path 608 may include a communication port(s) configured to transmit and/or receive data from at least one of the ADA system 110, the automatic driving assist systems 110, e.g., the AEB system 111 and the LKA system 112, the forward-facing radar 114, the forward-facing camera, 118, the emergency response sirens 126, the switch 128, the display 130, the antenna 136.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A method to control an automatic driver assist system of a vehicle, the method comprising:
    identifying, using control circuitry, a first condition in the vehicle;
    in response to identifying the first condition in the vehicle, preventing, using the control circuitry, a device necessary for a function of the automatic driver assist system from inputting data into a controller of the automatic driver assist system by interrupting a data channel to the automatic driver assist system, such that the function of the automatic driver assist system is restricted and the device necessary for the function of the automatic driver assist system remains available for use by another system of the vehicle;
    identifying a second condition in the vehicle by:
        determining that a siren of the vehicle is activated; and
        determining that the automatic driver assist system is inactivated; and
    in response to identifying the second condition in the vehicle, reactivating the automatic driver assist system by allowing data from the device necessary for the function of the automatic driver assist system to be input into the controller of the automatic driver assist system via the data channel.

2. The method of claim 1, wherein preventing the device from inputting data into the controller of the automatic driver assist system comprises powering down the device.

3. The method of claim 2, wherein powering down the device comprises interrupting a power supply of the device.

4. The method of claim 2, wherein powering down the device comprises adjusting one or more operational parameters of a component of the device.

5. The method of claim 1, wherein preventing the device from inputting data into the controller of the automatic driver assist system comprises interrupting a data communication channel from the device.

6. The method of claim 1, wherein the automatic driver assist system is an autonomous emergency braking system.

7. The method of claim 1, wherein the device is a forward-facing radar.

8. The method of claim 1, wherein the automatic driver assist system is a lane-keeping assist system.

9. The method of claim 1, wherein the device is an image processing module.

10. The method of claim 1, wherein the first condition identified is at least one selected from a group comprising a range of GPS coordinates, a driving style, an on-off state of emergency response sirens, an on-off state lights and/or lamps, an acceleration of the vehicle, a movement of the vehicle, and/or an output of a sensor.

11. The method of claim 1, wherein the first condition identified is a state of an activation-deactivation switch.

12. The method of claim 1, further comprising communicating an activation or deactivation status of the automatic driver assist system to a vehicle control server.

13. The method of claim 12, further comprising receiving one or more instructions from the vehicle control server to reactivate or deactivate the automatic driver assist system.

14. The method of claim 1, wherein determining the first condition comprises:
determining that a siren of the vehicle is inactivated; and
determining that the automatic driver assist system is activated.

15. The method of claim 1, wherein the device is a sensor, the method further comprising:
adjusting an operational parameter of the sensor to reduce sensitivity of the sensor to prevent the sensor from inputting data into the controller of the automatic driver assist system.

16. An automatic driver assist control system comprising a device necessary for a function of an automatic driver assist system and control circuitry, wherein the control circuitry is configured to:

identify a first condition in the vehicle;
prevent the device from inputting data into a controller of the automatic driver assist system in response to identifying the first condition in the vehicle by interrupting a data channel to the automatic driver assist system, such that the function of the automatic driver assist system is restricted and the device necessary for the function of the automatic driver assist system remains available for use by another system of the vehicle;
identify a second condition in the vehicle by:
determining that a siren of the vehicle is activated; and
determining that the automatic driver assist system is inactivated; and
in response to identifying the second condition in the vehicle, reactivate the automatic driver assist system by allowing data from the device necessary for the function of the automatic driver assist system to be input into the controller of the automatic driver assist system via the data channel.

17. A vehicle comprising the automatic driver assist control system of claim 16.

18. A non-transitory computer-readable medium having non-transitory computer-readable instructions encoded thereon for controlling an automatic driver assist system, when executed by control circuitry cause the control circuitry to perform the steps of:

identifying a first condition in the vehicle;
in response to identifying the first condition in the vehicle, preventing a device necessary for a function of the automatic driver assist system from inputting data into a controller of the automatic driver assist system by interrupting a data channel to the automatic driver assist system, such that the function of the automatic driver assist system is restricted and the device necessary for the function of the automatic driver assist system remains available for use by another system of the vehicle;
identifying a second condition in the vehicle by:
determining that a siren of the vehicle is activated; and
determining that the automatic driver assist system is inactivated; and
in response to identifying the second condition in the vehicle, reactivating the automatic driver assist system by allowing data from the device necessary for the function of the automatic driver assist system to be input into the controller of the automatic driver assist system via the data channel.

* * * * *